United States Patent [19]

Hupka et al.

[11] Patent Number: 5,036,403

[45] Date of Patent: Jul. 30, 1991

[54] MODE OF OPERATING OF A CIRCUIT ARRANGEMENT FOR IMPROVING THE BOUNCE BEHAVIOR OF PRINT FORM ENGRAVING SYSTEMS

[75] Inventors: Rolf Hupka, Flintbek; Christian Wiechering, Kiel, both of Fed. Rep. of Germany

[73] Assignee: Dr. Ing. Rudolf Hell GmbH, Fed. Rep. of Germany

[21] Appl. No.: 458,758

[22] PCT Filed: Jul. 20, 1988

[86] PCT No.: PCT/DE88/00449

§ 371 Date: Jan. 22, 1990

§ 102(e) Date: Jan. 22, 1990

[87] PCT Pub. No.: WO89/00502

PCT Pub. Date: Jan. 26, 1989

[30] Foreign Application Priority Data

Jul. 22, 1987 [DE] Fed. Rep. of Germany ....... 3724256

[51] Int. Cl.[5] ........................ H04N 1/21; H04N 1/23; H04N 1/032

[52] U.S. Cl. .................................................... 358/299

[58] Field of Search ................ 358/299; 318/611, 621; 364/474.08, 474.12

[56] References Cited

U.S. PATENT DOCUMENTS

| | | | |
|---|---|---|---|
| 4,245,260 | 1/1981 | Doelves | 358/299 |
| 4,259,697 | 3/1981 | Doelves | 358/299 |
| 4,536,803 | 8/1985 | Henning | 358/299 |

FOREIGN PATENT DOCUMENTS

| | | |
|---|---|---|
| 0071772 | 2/1983 | European Pat. Off. . |
| 1554196 | 3/1967 | France . |
| 2401772 | 9/1977 | France . |
| 770885 | 3/1957 | United Kingdom . |

*Primary Examiner*—Benjamin R. Fuller

*Assistant Examiner*—Scott A. Rogers

*Attorney, Agent, or Firm*—Hill, Van Santen, Steadman & Simpson

[57] ABSTRACT

A method for operating a circuit arrangement to improve the bounce behavior of an electromagnetically driven engraving system by producing a correction signal from a stored original drive signal and supplying the correction signal to the engraving system chronologically preceding application of the original drive signal.

3 Claims, 2 Drawing Sheets

MODE OF OPERATING OF A CIRCUIT ARRANGEMENT FOR IMPROVING THE BOUNCE BEHAVIOR OF PRINT FORM ENGRAVING SYSTEMS

BACKGROUND OF THE INVENTION

1. Field of the Invention

The invention is directed to the mode of operation of a circuit arrangement for improving the bounce behavior of engraving systems for electromechanically engraving printing forms.

DESCRIPTION OF THE RELATED ART

Engraving systems as employed for electromechanically engraving rotogravure forms have been extensively described in German Patent 2 336 089 in terms of their structure and their functioning.

It becomes clear from the said patent that such a system, this representing a spring-mass system, must be damped on the one hand so that driving with steep contour discontinuities in the image signal does not excite the system to overshoot with attenuated decay in the natural resonance. This would result in image errors in the engraving following steep discontinuities in the gradation values.

On the other hand, however, such a system must be fast enough in terms of its bounce behavior in order to also be able to follow steep discontinuities in gradation value at sharp image contours with adequate speed because sharp image contours in the original would otherwise be reproduced unsharp in the engraving.

Practice has shown that these two demands cannot be satisfied in common in a completely satisfactory way given the high demands that are presently made in reproduction technology. When an engraving system is damped—for instance, with the means disclosed in German Patent 2 336 089—to such an extent that overshooting and decay events are no longer visible in the engraving, then the rise time given steep discontinuities in gradation value is usually no longer short enough in order to reproduce the contours in the engraving with satisfactory sharpness.

German Patent 31 30 353 discloses a method and a circuit arrangement for improving the transient response of electromagnetic transducers. The said patent is particularly directed to utilization in combination with loudspeakers wherein problems that are similar to those set forth above derive due to the pulse character of sound events. Compared to engraving systems, however, loudspeakers need not work down to a lower limit frequency of $f_u=0$ Hz. Claim 1 of the said patent thus therefore states that a correction signal for improving the transient response is acquired from measuring two successively following peak values. It becomes clear therefrom as well as from the description of the arrangement that this method can only work given operation with alternating current down to a limit frequency of $f_u$ 0.

The arrangement is thus not in the position to improve the bounce behavior of engraving systems since operation down to a limit frequency of $f_u=0$ is an unalterable demand therefor.

DE-A-27 39 977 that corresponds to FR-A 2 401 722 discloses a method for producing rastered printing forms wherein, for improving the contour reproduction, an original is scanned with higher resolution in scanning direction than the resolution of the printing raster in that additional, intermediate image values are acquired during the analog-to-digital conversion of the image signal between the digital, main image values generated with the frequency of the scan signal and are further-processed with the main image values in the sequence of their creation and are superimposed on the scan signal. Although printing forms are engraved in this method, engraving stylus systems that vibrate greatly are not intended to be compensated.

It is an object of the present invention to specify the mode of operation of a circuit arrangement that improves the bounce behavior of electromagnetic transducers—particularly of engraving systems—down to a limit frequency of 0 Hz.

The invention achieves this on the basis of the operation recited in claim 1. Advantageous developments are recited in the sub-claims.

BRIEF DESCRIPTION OF THE DRAWINGS

The invention shall be set forth in greater detail below with reference to FIGS. 1 through 6.

Shown are.

DESCRIPTION OF THE PREFERRED EMBODIMENT

Figure 1:
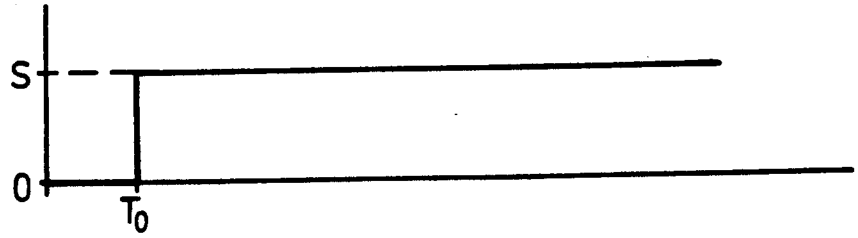
FIG. 1: the chronological course of the drive signal.

For explaining the functioning, it shall be assumed that, as shown in FIG. 1, a rectangular skip from 0 to the ultimate value S ensues at the signal output at the time $T_0$, whereby the engraving system should mechanically follow this. This represents the hardest case that occurs in practice.

Figure 2:
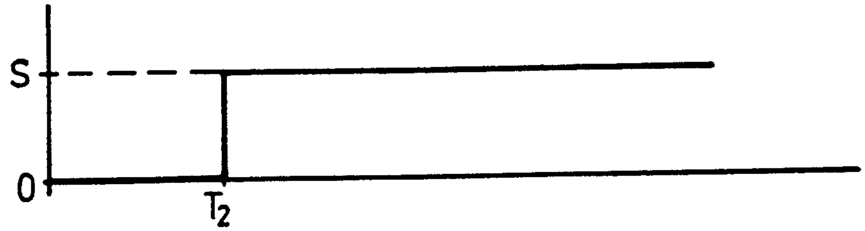
FIG. 2: delayed time signal.
Figure 3:
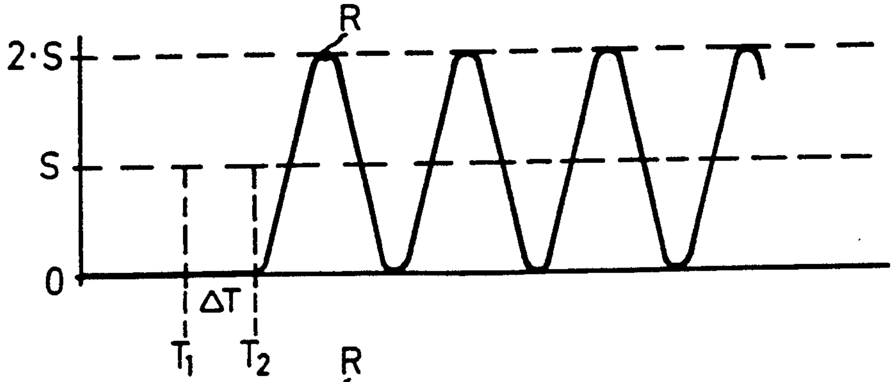
FIG. 3: oscillations of an undamped system.

The invention is based on the following consideration:

When a linear, completely undamped spring-mass system is excited by a rectangular skip in rated value, as shown in FIG. 2, then, as shown in FIG. 3, it continues to oscillate with its characteristic, natural frequency with double the amplitude of the rated value skip after the skip.

In a practically executed system, a damping is always present, being even potentially effected by measures specifically provided for this reason.

Figure 4:
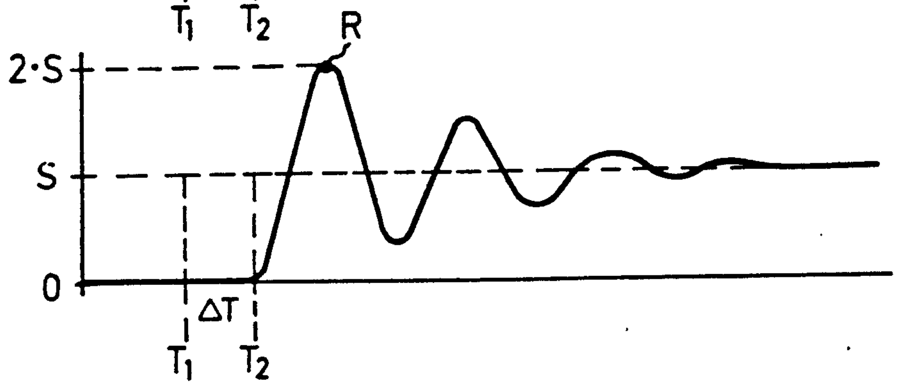
FIG. 4: oscillations of a damped system.

Such a system will follow the curve reproduced in FIG. 4; the undesired, resonant oscillation will decay due to the attenuation until the system ultimately remains in the new final position that corresponds to the rated value skip. As already mentioned above, this transiency leads to image disturbances.

Here, too, however, the first cusp point lies at double the amplitude of the rated value skip in a good approximation—as it does in FIG. 3.

Figure 5:
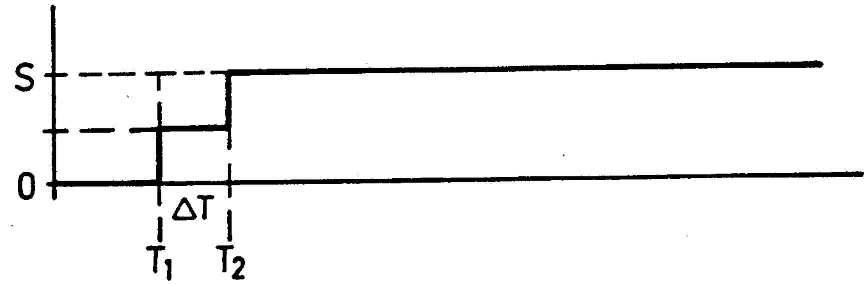
FIG. 5: delayed drive signal and correction signal.

When it is then assumed that the incoming signal of FIG. 1 is supplied to a delay element (for example, to a sample-and-hold circuit) that outputs it again after a time $T_2$–$T_0$ (FIG. 5) then a correction signal can be derived from the rated signal during this storage time. For a rectangular skip of the useful signal, this correction signal advantageously has half the amplitude value of the useful signal (FIG. 5) and has the length of a quarter period of the characteristic oscillation of the system and is likewise advantageously rectangular.

Figure 6:
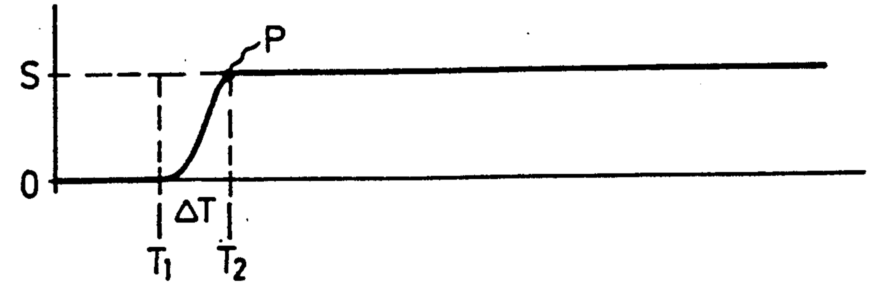
FIG. 6: excursion of the engraving system.

When, as shown in FIG. 6, this correction signal is placed chronologically preceding the useful signal during output, then the engraving system will already skip to the point P upon application of the correction signal (double the amplitude of the correction signal). At time $T_2$, the engraving system has just reached the rated value and the excursion speed is 0. When the delay circuit then forwards the full, new rated value to the system at this time $T_2$, then the system experiences no further accelerations but remains at the desired rated excursion.

That stated above applies exactly only to linear systems. The spring of such systems is usually fashioned as a non-linear torsion spring and the forces of the permanent magnetic flux also act on the armature like the spring having a non-linear characteristic. Further, different engraving systems have slight scatters in the resonant frequency in manufacture.

For exact matching, it is therefore advantageous to make the correction signal variable with respect to amplitude and duration.

Due to the non-linear characteristic, it is also advantageous to control the amplitude and duration of the correction signal dependent on the difference in gradation value (skip height) and dependent on the gradation value itself.

A number of solutions can be applied with respect to the embodiment of the circuit arrangement. For example, the signal can be quantized and input as well as output can be effected by a shift register controlled with a clock generator. The correction signal can be acquired with regulated and controlled voltage dividers and can likewise be output by the clock control.

Solutions are also conceivable that undertake the storing and output in analog form with clocked sample-and-hold circuits.

In any case, such circuit arrangements can be constructed with means at the command of any one skilled in the art.

Figure 7:
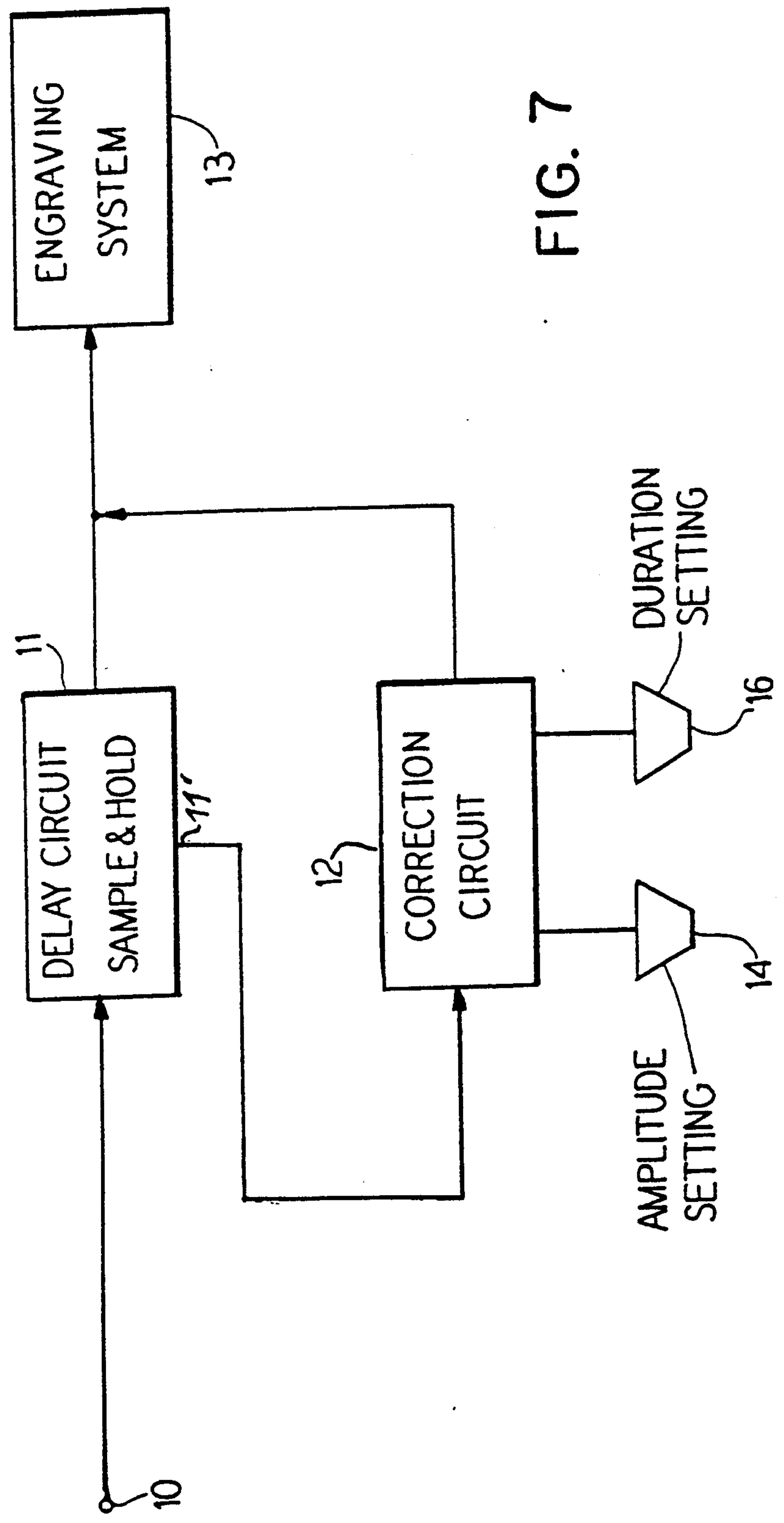
FIG. 7 is a schematic view of the invention.

FIG. 7 illustrates the apparatus for practicing the invention. An engraving signal is supplied to terminal 10 and supplied to delay circuit 11 which may be a sample and hold circuit. The output 11' of the delay circuit 11 is connected to a correction circuit 12 which can be adjusted to vary the amplitude of the correction signal by amplitude setting knob 14. A duration setting knob 16 allows the time of phase delay of circuit 12 to be set. The outputs of circuits 11 and 12 are combined and supplied as a command signal corrected according to the invention to an engraving system 13.

What is claimed is:

1. A method of operating a circuit arrangement for improving a bounce behavior of an engraving system electromagnetically driven by an electrical drive signal for engraving printing forms, comprising the steps of intermediately storing a original electrical drive signal in a storage unit, producing a correction signal from said stored original electrical drive signal during a storage time of said signal in said storage unit, supplying said correction signal to said engraving system and supplying said stored original electrical drive signal to said engraving system after the end of the storage time, whereby said correction signal chronologically precedes the original electrical drive signal when supplied to said engraving system.

2. A method of operating a circuit arrangement according to claim 1, wherein said correction signal ia variable in amplitude and effective duration.

3. A method of operating a circuit arrangement according to claim 1 or 2, characterized in that said correction signal is varied in amplitude and effective duration depending on a skip in graduation value respectively to be reproduced and depending on the gradation value.

* * * * *